United States Patent Office 3,787,551
Patented Jan. 22, 1974

3,787,551
SOLVENT REMOVAL FROM AROMATIC
POLYAMIDE FILM
Elliot A. Vogelfanger, Edison, and Richard L. Markham, North Plainfield, N.J., assignors to Celanese Corporation, New York, N.Y.
Filed Dec. 27, 1971, Ser. No. 212,666
Int. Cl. B29c 25/00; B01d 1/22
U.S. Cl. 264—345
9 Claims

ABSTRACT OF THE DISCLOSURE

A process for removal of residual organic solvents included in wholly-aromatic polyamide film by subjecting the film containing the residual solvent to a temperature in the range of above the glass transition temperature.

BACKGROUND OF THE DISCLOSURE

Field of the invention

The instant invention is directed to a process for the production of aromatic polyamide films. More particularly, the instant invention is directed to a process in which formed aromatic polyamide films are subjected to high temperatures to remove residual solvent from such films to enhance their stability and utility.

Description of the prior art

Wholly-aromatic polyamides and the polymer films formed therefrom have come into prominence in recent years because of their unique combination of physical and chemical properties. Aromatic polyamide films, for example, are strongly abrasion resistant and stable at elevated temperatures. These films, possessing these desirable properties, have found important markets in such areas as insulation, electrical wiring, printed circuits, automotive and aviation interior headlining materials, decorative trim and the like.

The wholly-aromatic polyamides of the instant invention are usually produced by the reaction of one or more aromatic diamines and one or more aromatic acid dihalides in the presence of a mutual solvent for the reaction. The resultant aromatic polyamide is then formed into a film having the indicated highly useful properties. Available prior art which discloses the formation of such aromatic polyamides include U.S. Pats. 3,068,188; 3,094,511; 3,287,324; and 3,354,127.

One of the major difficulties in the preparation of these completely aromatic polyamide films, as recognized by the prior art, has been the problem of solvent removal. The solvents employed in the polyamide forming reaction are preferably high boiling highly dipolar aprotic liquids. Because these solvents boil at high temperatures they are difficult to remove from the film cast from polyamide casting solutions. It is well known that the desirable physical properties of aromatic polyamide films are significantly diminished when they contain significant amounts of residual solvents.

In the prior art, residual solvents have been removed by thermal treatment. However, these procedures are not entirely satisfactory in that the residual solvent concentration oftentimes exceed the maximum allowable solvent concentration above which the properties of the aromatic polyamide film begins to suffer.

In commonly assigned co-pending application, Ser. No. 69,459, filed on September 3, 1970, a unique method for removing solvents from aromatic polyamide film is presented. This method is a distinct improvement over the methods of the prior art in that the residual solvent concentration in aromatic polyamide film after treatment by the method of this invention is significantly below average concentrations previously attained. However, the process of the co-pending application is relatively cumbersome, time consuming and expensive compared to the process herein disclosed.

SUMMARY OF THE INSTANT INVENTION

The instant invention is directed to a process which results in substantially complete removal of organic solvents from wholly-aromatic polyamide films and yet is simple to perform at low cost and is accomplished over a short time period. In the unique process of the instant invention in which solvent concentration is decreased to within acceptable limits higher temperatures are employed than heretofore employed.

In accordance with the instant invention aromatic polyamide film is subjected to high temperature heating to reduce the equilibrium film solvent concentration to about 0.2 to 0.3% by weight. This is accomplished by subjecting aromatic polyamide film to temperatures in excess of the glass transition temperature of the aromatic polyamide polymer. Of course, the glass transititon temperature of different aromatic polyamides vary. In a preferred embodiment, where a preferred aromatic polyamide, 70/30 meta/para phenylene diamine isophthalamide, a temperature in excess of about 520° F., the glass transition temperature for this polyamide, is employed. The upper temperature limit is the temperature at which the aromatic polyamide begins to decompose, about 700° F.

BRIEF DESCRIPTION OF THE DRAWINGS

The instant invention may be better understood by reference to the accompanying drawings of which.

DETAILED DESCRIPTION

Figure 1:
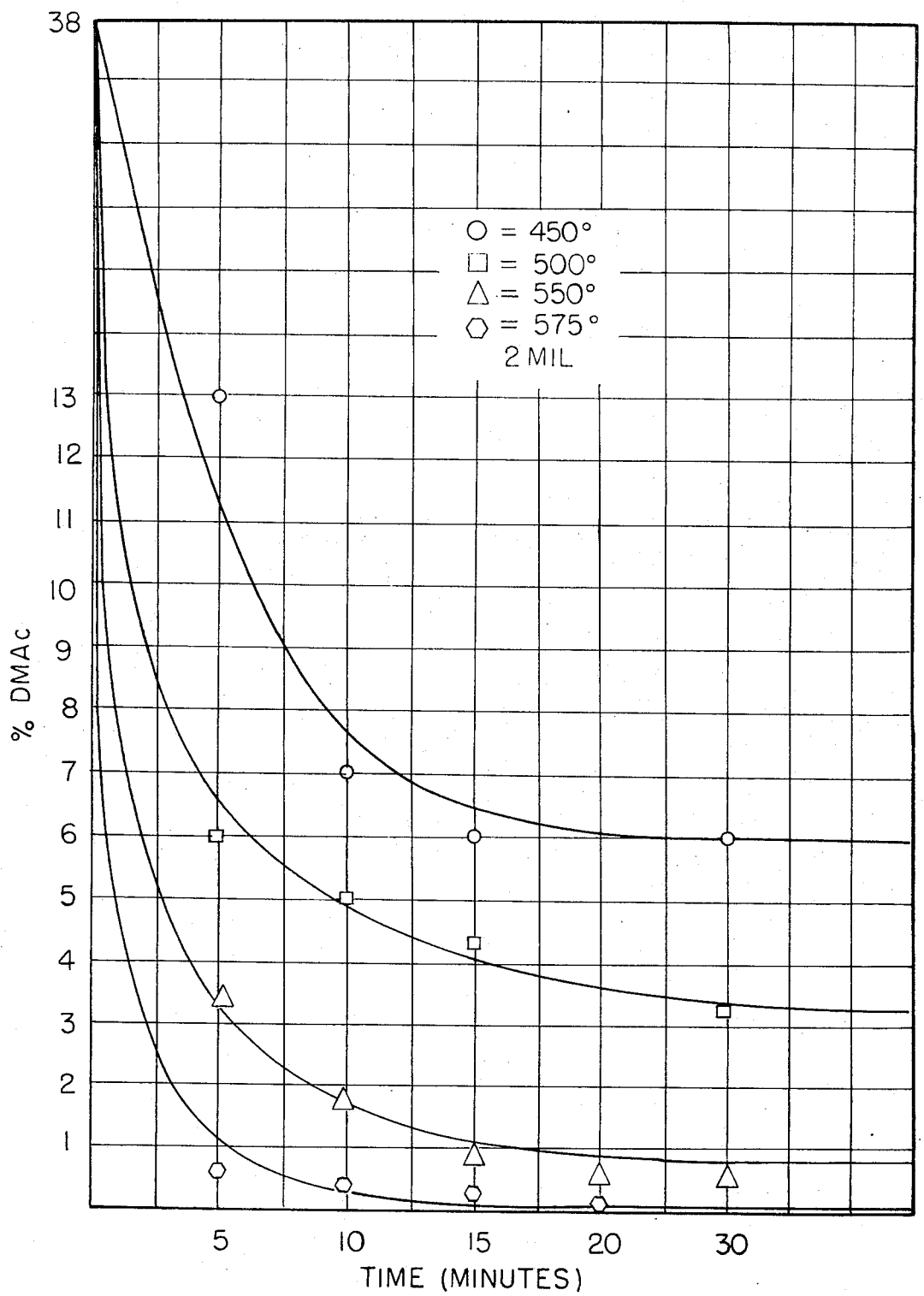
FIG. 1 is a graph showing the effect of drying temperature on solvent removal from an aromatic polyamide film as a function of time.

According to the instant invention, a procedure has been developed for the substantially complete removal of residual solvents from wholly-aromatic polyamide films. It is well known that the physical properties of aromatic polyamide film suffers when the film contains excessive amounts of residual solvents. Aromatic polyamide film containing more than 1% by weight of residual solvent is significantly reduced in hardness. Aromatic polyamide film containing more than 1% of residual solvent is soft and may be stretched. It has lower tensile strength than aromatic polyamide film containing solvent in concentration of less than 1%. This loss in tensile strength is accelerated at higher temperatures. In view of the fact that aromatic polyamide film finds particular application as a high strength film at elevated temperatures, the requirement that this residual solvent concentration be below 1% by weight is critical.

The wholly-aromatic polyamide film of the instant invention are preferably prepared by the reaction of one or more aromatic diamines with one or more aromatic diacid halides.

The diamines reactants used in forming the polymer of the invention are compounds of the formula $$R_1-NH-Ar_1-NH-R_1$$

wherein $R_1$ is a lower alkyl or hydrogen and $Ar_1$ is a divalent aromatic radical in which the intralinear polymer bonds are attached directly to non-adjacent carbon atoms in the aromatic rings, the bonds being preferably positioned in the meta position in 50–80% of the $Ar_1$ radicals. The NHR groups are usually oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl and lower carbalkoxy.

Exemplary diamines which may be utilized in this invention include meta- or para-phenylene diamine and lower alkyl substituted derivatives thereof such as methyl, ethyl, propyl, and butyl meta- or para-phenylene diamine, N,N'-dimethyl meta- or para-phenylene diamine, N,N'-diethyl meta- or para-phenylene diamine, etc. There may be more than one alkyl group attached to the aromatic ring as in the case of dimethyl, trimethyl, tetramethyl, diethyl, and triethyl meta- or para-phenylene diamine. The alkyl substituent groups need not be the same because compounds such as 2-methyl-4-ethyl meta- or para-phenylene diamine and 2-methyl-4-ethyl-5-propyl meta- or para-phenylene diamine may be utilized. In place of an alkyl group, the aromatic ring may be substituted with one or more lower alkoxy groups such as, for example, methoxy, ethoxy, propoxy, butoxy, meta- or para-phenylene diamine. Other representative aromatic diamines which may be utilized include dimethoxy, trimethoxy, tetramethoxy, diethoxy meta- or para-phenylene diamine, and 2-methoxy-4-ethoxy meta- or para-phenylene diamine. Halogen-substituted meta- or para-phenylene diamine as exemplified by chloro, bromo, and fluoro meta- or para-phenylene diamine may be utilized. More than one halogen may be attached to the aromatic ring. The halogens in these compounds may be the same or different as in the case of the dihalo compound. Other meta- or para-phenylene diamines which may be used include nitro and lower carbalkoxy meta- or para-phenylene diamines. One or more of the latter groups may be attached to the aromatic nucleus along with one or more alkyl, alkoxy, or halogen groups. Mixtures of different diamine compounds may also be used. In fact, the most preferred reactant is a 70/30 molar mixture of meta- and para-phenylene diamine.

As stated above, the diamines are preferably reacted with one or more aromatic diacid halides. The acid halide reactant comprises a mixture of at least one aromatic dicarboxylic acid halide, preferably the chloride. Diacid chlorides of dibasic aromatic acids useful as reactants in preparing polymers of the instant invention are compounds of the formula

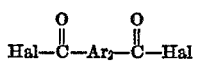

wherein $Ar_2$ is a divalent aromatic radical and Hal is a halogen atom of the class consisting of chloride, bromine and fluorine. The aromatic radical may have a single, multiple or fused ring structure. One or more hydrogens of the aromatic nucleus may be replaced by a non-polyamide forming group such as lower alkyl, lower alkoxy, halogen, nitro, sulfonyl, lower carbalkoxy and the like. The terms "lower alkyl" and "lower alkoxy" refer to groups containing less than 5 carbon atoms.

Diacid chlorides which may be utilized to prepare the aromatic polyamides of this invention include iso and terephthaloyl and lower alkyl iso and terephthaloyl chlorides, such as methyl, ethyl, propyl, etc., iso and terephthaloyl chlorides. There may be more than one alkyl group attached to the aromatic ring as in the case of dimethyl, trimethyl, tetramethyl, diethyl, triethyl, and tetraethyl isophthaloyl chlorides. The most preferred reactant is isophthaloyl chloride.

The high molecular weight polymer prepared by the reaction of one or more diamines with one or more aromatic diacid halides of the type described above is a high molecular weight polymer termed an "aromatic polyamide."

This term refers to a polymer wherein aromatic radicals are linked by a carbonamide group, i.e., the

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals have the following structural formulas:

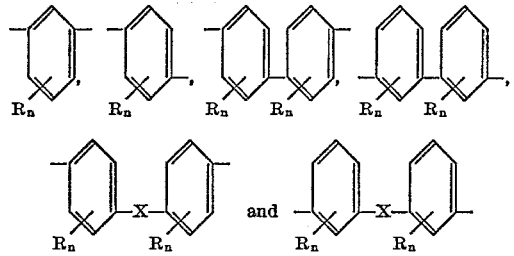

in which R is preferably a lower alkyl, lower alkoxy, or halogen group, $n$ is a number from 0–4, inclusive, and X is preferably one of the groups of

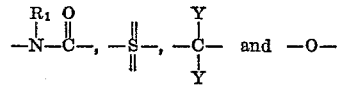

in which Y is a hydrogen or a lower alkyl and $R_1$ is a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, i.e., the unsatisfied bonds of the radicals (the "intralinear bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. The total number of substituent groups or carbon atoms attached to any aromatic ring is desirably less than about four and preferably all the aromatic radicals are phenylene.

Specifically, the aromatic polyamide of the instant invention is a high molecular weight polymer having the following repeating structural unit:

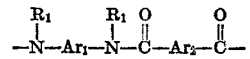

where $R_1$ is selected from the group consisting of hydrogen and lower alkyl and $Ar_1$ and $Ar_2$ are divalent aromatic radicals. In the most preferred polymers, the intralinear polymer bonds are attached directly to non-adjacent carbon atoms in the respective aromatic rings the bonds being positioned in the meta position in 50–80% of the $Ar_1$ radicals and in the para position in the remaining $Ar_1$ radicals.

The preferred reaction of a diamine and a diacid halide occurs in a polymerization solvent. In one preferred embodiment of the film forming method the aromatic polyamide is polymerized and precipitated from the solution. The solid polymer is thereafter dissolved in a casting solvent. The solution is cast into a film. In a second preferred embodiment the diamine and diacid halide reactants are reacted in a solvent and directly cast into a film. In this embodiment an aromatic polyamide casting solution is directly formed. The same type of compound is preferably employed as a polymerization solvent as well as a casting solvent. Such a compound is generally classified as an organic dipolar aprotic liquid. This class of organic compounds is illustrated by, but not limited to, the following examples: N,N-dimethylacetamide; N,N-dimethylformamide; N-methylpyrrolidone; N-cyclohexylpyrrolidone; N-phenylpyrrolidone; gamma-butyrolactone; N,N-diethylacetamide, 2,2-lutidine; methylene chloride; hexamethylphosphoramide; dimethyl sulfoxide; N,N,N',N'-tetramethylurea; mixtures thereof; and the like.

In the case where the aromatic polyamide is cast from precipitated polymer, the casting solvent may or may not be the same as the polymerization solvent. It should be appreciated that N,N'-dimethyl acetamide, N,N'-dimethylformamide and N-methylpyrrolidone are particularly preferred casting solvents in the formation of casting solutions.

The resultant cast aromatic polyamide film which contains approximately 5 to 50% by weight of the high boiling solvent is treated to remove the solvent. In the prior art, this procedure was usually not completely successful in that the residual solvent concentration was oftentimes not decreased to below 1% by weight. As described above, the specific properties of aromatic polyamide film which make it particularly attractive, particularly high strength at elevated temperatures, are adversely effected by residual solvent concentration of greater than 1%.

In accordance with the process of the instant invention aromatic polyamide film containing less than 1% by weight of residual solvent is produced. This is accomplished by heating, in suitable heating means, the aromatic polyamide film, containing 5 to 50% by weight of solvent, to a temperature above the glass transition temperature of the aromatic polyamide involved. The surprisingly successful results attained by this high temperature heating is theorized to be due to the discontinuous increase in molecular motion in the aromatic polyamide polymer which is postulated to release the solvent which is thought to be connected by hydrogen and polar bonding to the aromatic polyamide polymer.

Heating at temperatures in excess of the glass transition temperature not only provides an aromatic polyamide film whose solvent concentration is less than 1% by weight, but, moreover, provides a stronger, more uniform film. When a polymeric film is heated above its glass transition temperature any strains which may be present in the film are eliminated. Thus, the process of the invention results in a stronger, more uniform film in addition to one having a satisfactorily low residual solvent concentration, than the aromatic polyamide films of the prior art.

The temperature to which the aromatic polyamide film is subjected is limited, of course, to an upper limit defined by the temperature at which the film begins to decompose. Above this temperature the non-totally solid film loses its strength and begins to break when moved over rollers and other processing equipment. Aromatic polyamides usually decompose at a temperature of about 700° F. and thus, the preferred upper temperature limit is 700° F.

The glass transition temperature of the aromatic polyamide is a function of the particular aromatic polyamide employed. In a preferred embodiment in which a preferred aromatic polyamide, 70/30 meta/para phenylene diamine isophthalamide, is employed the glass transition temperature is 520° F. Thus, this polyamide is heated to above this temperature during solvent removal.

It should be appreciated that the time required to reduce the residual solvent concentration is a function of the film thickness as well as the initial solvent concentration. In this regard it should be understood that the instant invention contemplates initial temperatures lower than those required to finally reduce the solvent concentration to below 1% by weight. Initial solvent removal temperatures are obviously dictated by initial solvent concentration as well as the tradeoff between contact time and heating costs. As will be made obvious from the examples below, however, aromatic polyamide film must ultimately be subjected to temperatures above the glass transition temperature to complete the solvent removal procedure and this temperature is independent of exposure time and film thickness. This is particularly important in view of the many futile attempts by the applicants and in the prior art to reduce solvent concentrations in aromatic polyamide films to suitable levels, i.e. less than 1% by long time drying at temperatures below the glass transition temperature.

The following examples are presented to illustrate the instant invention. The scope of the instant invention, although illustrated by the following examples, should not be interpreted as in any way being limited to these illustrations.

EXAMPLES I–IV

An aromatic polyamide polymer, 70/30 meta/para phenylene diamine isophthalamide, is prepared by the reaction of equimolar proportions of isophthaloyl chloride with a 70:30 molar ratio of meta/para phenylene diamine. The isophthalamide aromatic polyamide is dissolved in a dipolar aprotic liquid, N,N-dimethylacetamide, to form a casting solution or dope.

A film is cast directly from the casting solution. The film, which is 2 mils thick, initially contains a solvent concentration of 38% by weight of the film.

Four samples of this film are separately heated in a vented oven for 30 minutes each. Each sample, which is heated at a different temperature, is measured five times during this heating period to determine its residual solvent concentration. The four samples which represent Examples I–IV, are heated at 450° F., 500° F., 550° F., and 575° F. respectively.

TABLE I.—SOLVENT CONCENTRATION IN PERCENT BY WEIGHT

| Time, min. | Example | | | |
| --- | --- | --- | --- | --- |
| | I, 450° F. heating | II, 500° F. heating | III, 550° F. heating | IV, 575° F. heating |
| 0 | 38 | 38 | 38 | 38 |
| 5 | 13 | 6 | 3.3 | 1.1 |
| 10 | 7 | 5 | 1.7 | 0.4 |
| 15 | 6 | 4.3 | 1.0 | 0.2 |
| 20 | 7 | 5.3 | 0.7 | 0.1 |
| 30 | 6 | 3.3 | 0.7 | |

The results summarized in Table I are depicted in FIG. 1. FIG. 1 clearly indicates that for each temperature tested a steady state solvent concentration, which is practically unchanged with time, is attained. Thus, it can be reasonably stated that drying temperature rather than drying time is the critical parameter. Table I and FIG. 1 more importantly provide evidence that in order to attain a satisfactorily low residual solvent concentration, below 1%, aromatic polyamide films must be heated to a temperature in excess of the glass transition temperature.

FIG. 1, furthermore, suggests the further teaching that the initial drying temperature does not affect the ultimate residual solvent concentration. Low initial solvent removal temperatures merely increase the time required to decrease the solvent concentration to the desired level below 1%. The critical requirement is of course that aromatic polyamide film be subjected to a temperature in excess of the glass transition temperature for a period of time sufficient to reduce solvent concentration below 1% by weight. It should be noted that for 70/30 meta/para phenylene diamine isophthalamide the glass transition temperature is about 520° F. Thus, only the drying temperatures, 550° F. and 575° F., which are in excess of this temperature result in a film having the desired residual solvent concentration.

EXAMPLES V–VI

Two additional films are prepared from the same aromatic casting solution. The solution is prepared by the procedure set forth in Examples I–IV. The two films differ only in that the first is 1 mil thick while the second has a thickness of 2 mils.

Again samples of each film are dried for 30 minutes in a vented oven during which time residual solvent concentration readings are taken at regular intervals. Although the initial solvent concentration of the two films differ, this is not found to be significant, in view of the fact that the film having the higher solvent concentration is reduced to the initial solvent concentration of the other sample in approximately 15 seconds during drying. Both samples were dried at 550° F. The results of these tests are summarized in Table II and depicted visually in FIG. 2.

TABLE II.—SOLVENT CONCENTRATION IN PERCENT BY WEIGHT

[Drying at 550° F.]

| Time, min. | Example | |
|---|---|---|
| | V, 1 mil film | VI, 2 mil film |
| 0 | 19 | 12 |
| 5 | 1.4 | |
| 10 | 1.1 | 0.9 |
| 15 | 0.4 | 0.1 |
| 20 | 0.5 | 0.6 |
| 30 | 0.2 | 0.3 |

Figure 2:
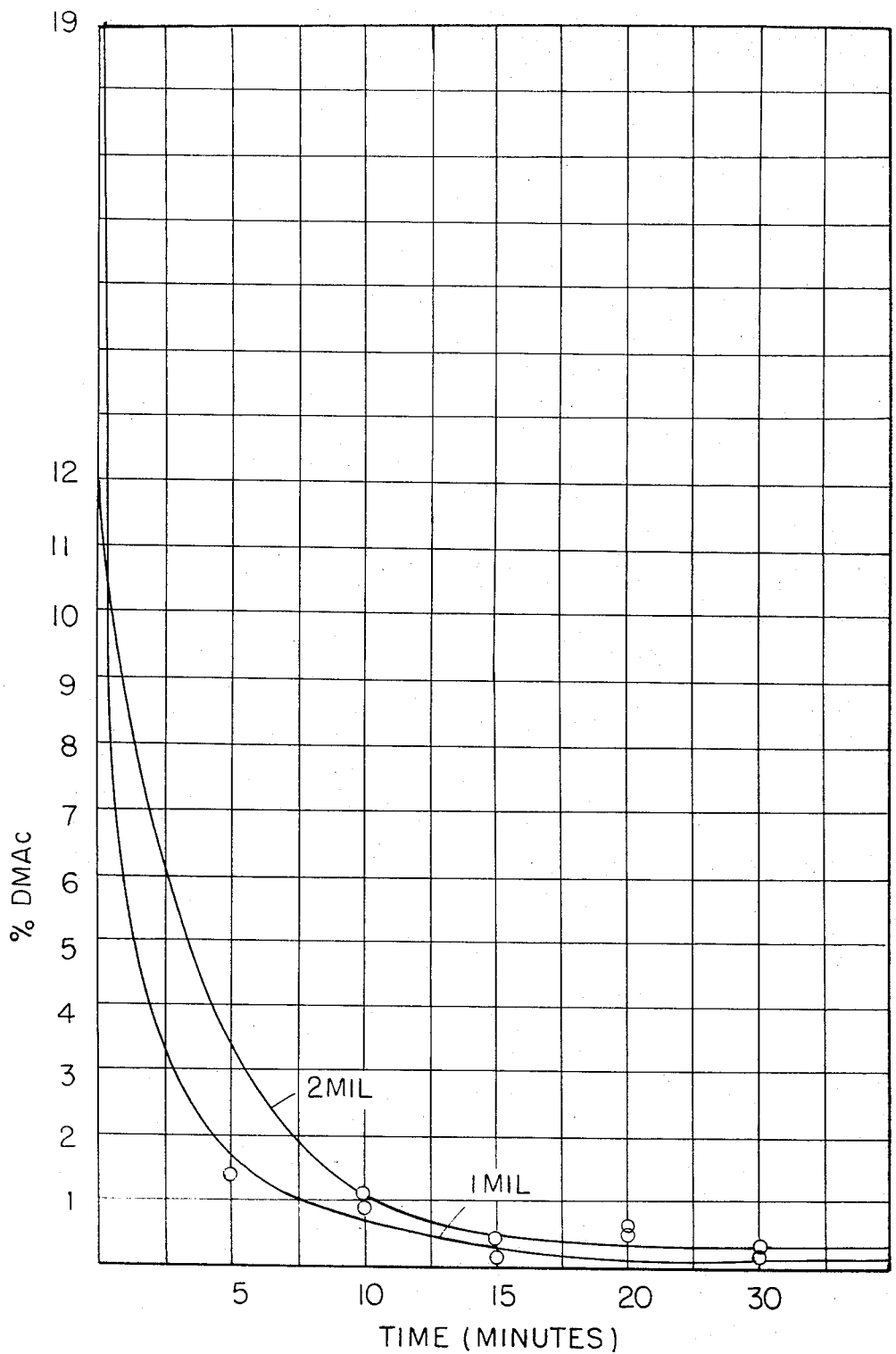
FIG. 2 is a graph showing the effects of film thickness on solvent removal from aromatic polyamide film as a function of time.

The above data graphically presented in FIG. 2 clearly shows that the equilibrium solvent concentration for the two films is approximately the same. Thus, it is reasonable to state that the required temperature necessary for solvent removal in aromatic polyamide film is independent of film thickness. Film thickness merely affects the drying time at the required temperature. As stated above, this temperature is in excess of the glass transition temperature.

The process of the instant invention has been described with reference to specific preferred embodiments and examples. These embodiments and examples are given to illustrate the scope and spirit of the instant invention. Thus, the scope and spirit of the instant invention should be limited only by the appended claims.

What is claimed is:

1. A process for the treatment of a wholly-aromatic polyamide film formed from a casting solution, said film characterized by the repeating structural unit

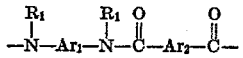

wherein $R_1$ is hydrogen or a lower alkyl and $Ar_1$ and $Ar_2$ are divalent aromatic radicals, to effect removal of organic solvent, said solvent being an organic dipolar aprotic liquid, which comprises heating said film to a temperature in excess of the glass transition temperature but below the temperature at which the film begins to decompose, of said aromatic polyamide for more than ten minutes wherein the solvent concentration of the aromatic polyamide film is reduced to not more than 1 percent by weight.

2. A process in accordance with claim 1 wherein said aromatic polyamide film is heated to a temperature not in excess of about 700° F.

3. A process in accordance with claim 1 wherein $Ar_1$ and $Ar_2$ are phenylene.

4. A process in accordance with claim 1 wherein $Ar_1$ and $Ar_2$ are substituted phenylene.

5. A process in accordance with claim 1 wherein said solvent is N,N-dimethylacetamide.

6. A process in accordance with claim 1 wherein said solvent is N-methylpyrrolidone.

7. A process in accordance with claim 1 wherein said solvent is N,N-dimethylformamide.

8. A process in accordance with claim 1 wherein said aromatic polyamide film is 70/30 meta/para phenylene diamine isophthalamide.

9. A process in accordance with claim 8 wherein said organic solvent is removed from said aromatic polyamide film by subjecting said film to a temperature in excess of 520° F.

References Cited

UNITED STATES PATENTS

| 3,079,219 | 2/1963 | King | 260—78 S |
| 3,414,645 | 12/1968 | Morgan | 260—78 S |
| 3,560,137 | 2/1971 | Hahn | 260—78 S |
| 3,600,361 | 8/1971 | Heacock | 264—216 |
| 3,696,076 | 10/1972 | Vogelfanger | 264—216 |

JACK SOFER, Primary Examiner

U.S. Cl. X.R.

159—Dig. 10, 49